United States Patent [19]

Harding

[11] 4,399,930
[45] Aug. 23, 1983

[54] FOAM DISPENSING GUN

[75] Inventor: Gary C. Harding, Thonotosassa, Fla.

[73] Assignee: Universal Foam Systems, Inc., Cudahy, Wis.

[21] Appl. No.: 317,384

[22] Filed: Nov. 2, 1981

Related U.S. Application Data

[63] Continuation-in-part of Ser. No. 266,494, May 22, 1981, abandoned, which is a continuation-in-part of Ser. No. 159,461, Jun. 16, 1980, Pat. No. 4,311,254.

[51] Int. Cl.³ .............................................. B05B 7/12
[52] U.S. Cl. .................................... 222/145; 251/241
[58] Field of Search ...................... 239/407, 527, 600; 251/323, 241; 222/135, 145, 134, 473, 485, 488

[56] References Cited

U.S. PATENT DOCUMENTS 3,871,584  3/1975  Wagner ........................... 239/600 X Primary Examiner—Stanley H. Tollberg
Attorney, Agent, or Firm—Ziems & Walter

[57] ABSTRACT

A foam dispensing gun of the type having a disposable nozzle for mixing and dispensing separate fluid components of a resin system. The nozzle is retained on the gun by a sliding breech which also pivotally supports a valve actuating trigger to be in an operative position when the breech is moved to retain a nozzle to the gun and disabled when the breech is moved to release the nozzle for reloading. The breech and trigger may be further arranged so that the trigger is inoperative in the absence of a nozzle on the gun.

10 Claims, 13 Drawing Figures

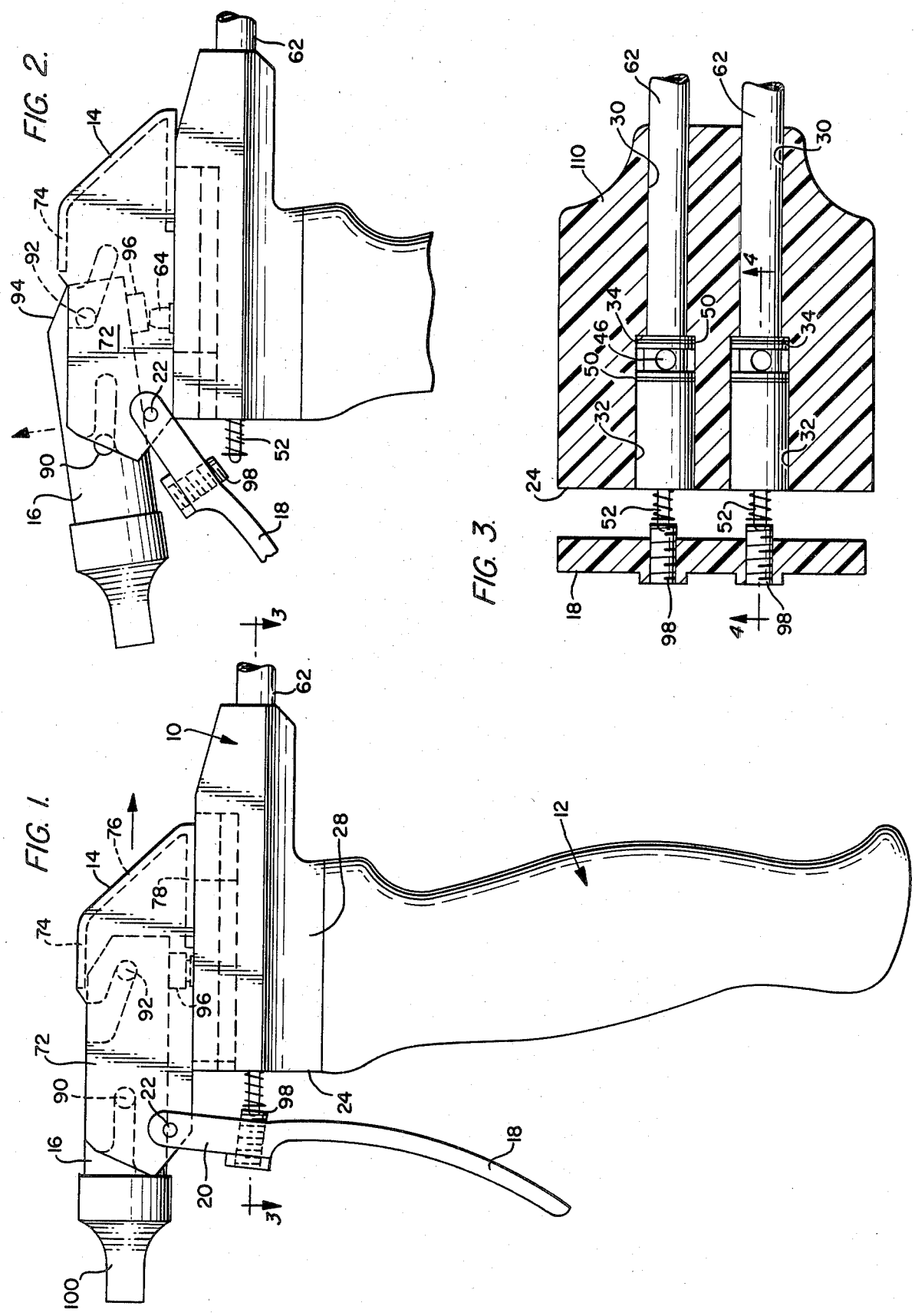

FOAM DISPENSING GUN

CROSS-REFERENCE TO RELATED APPLICATIONS

This application is a continuation-in-part of application Ser. No. 6/266,494, filed May 22, 1981 now abandoned which in turn is a continuation-in-part of application Ser. No. 6/159,461, filed June 16, 1980 now U.S. Pat. No. 4,311,254.

BACKGROUND OF THE INVENTION

This invention relates to apparatus for mixing and dispensing multi-component fluids and more particularly, it concerns foam dispensing guns adapted to be used with resin systems in which two or more fluid components, separately stored in pressurized vessels, are mixed and dispensed as settable foam.

U.S. Pat. No. 3,399,837, issued Sept. 3, 1968 to C. E. Frick, No. 3,633,795 and No. 3,784,110, the latter two having been issued respectively on Jan. 11, 1972 and Jan. 8, 1974 to William R. Brooks, disclose dispensing guns for urethane foam and the like in which separate fluid components are fed individually to the gun, passed separately through controlled valve ports and brought into contact with each other only upon reaching a mixing chamber of a nozzle from which the mixed components are discharged as foam. In each instance, the nozzle of the gun is designed to be disposable in order to avoid the necessity for cleaning any part of the gun which comes into contact with mixed as distinguished from separate foam producing fluid components. As a result, the initial fluent characteristics of the foam producing components may be maintained without wastage even through use of the gun may be interrupted for time intervals of sufficient duration for the mixture to set in and plug the nozzle. In other words, the gun is restored to a ready-to-use condition simply by replacing a nozzle plugged by solidified or set foam.

The fluid components of the foam producing resin system used with dispensing guns exemplified by the disclosures of the aforementioned patents, are fed to the gun under pressures up to 250 psi. Because of the pressure drop at the gun nozzle, the rate of fluid component flow is easily controlled by a relatively simple trigger actuated valve arrangement. Back pressure exerted on the nozzle in use, however, requires that the replaceable nozzle be retained on the gun body with sufficient holding force to handle the pressures involved without accidental dislodgement of the nozzle from the gun. In the past, the provision of a suitably strong nozzle mount has involved compromise with avoidance of complex, expensive or cumbersome gun structure.

An additional and particularly acute problem is presented in the design of such foaming guns due to the potential for accidental discharge of the fluid components when the nozzle is not in place on the gun. During the replacement of a nozzle, for example, accidental operation of the trigger-controlled valve on the gun could result in a sudden release of both fluid components under the pressures mentioned. The occurrence of such accidental discharge presents not only a safety hazard to the operator of the gun but also a source of potential damage to previously dispensed foam and the working environment in general. While safety devices have been proposed, they have generally required positive action on the part of the gun operator to place the gun in a "safe" condition. Thus, failure of the operator to take such action will result in the gun being left in an unsafe condition where accidental discharge of the unmixed fluid components might occur.

SUMMARY OF THE INVENTION

In accordance with the present invention, a foam dispensing gun is provided with a disposable nozzle mounting structure and integrated valve control trigger so that retention of the nozzle against component fluid pressure is assured and so that the control trigger is automatically disabled upon removal of a nozzle from the gun. These functional attributes are achieved very simply by a breech component slidable between positions of nozzle retention and nozzle release in a direction perpendicular to the direction of fluid component flow from the body of the gun to the nozzle. The valve control trigger is supported pivotally from the breech to be in an operative relationship with gun body carried valve stems when the breech is positioned to retain a nozzle. When the breech is retracted to release the nozzle for removal, however, the trigger is pivoted to an inoperative position away from the valve stems and cannot be returned to the operative position without movement of the breech either to engage and retain a nozzle or to at least partially block the gun body ports through which the fluid components of the resin system are fed to the nozzle.

A principal object of the present invention is, therefore, the provision of an improved foam dispensing gun of the type adapted for use with disposable nozzles, which is highly effective in operation, which is capable of low-cost manufacture using a minimal number of easily formed and assembled components and which is inherently safe in use. Other objects and further scope of applicability will become apparent from the detailed description to follow taken in conjunction with the accompanying drawings in which like parts ar designated by like reference numerals.

BRIEF DESCRIPTION OF THE DRAWINGS

FIG. 1 is a side elevation illustrating an assembled foam dispensing gun in accordance with the invention;

FIG. 2 is a fragmentary side elevation illustrating the gun of FIG. 1 with components positioned to receive a nozzle;

FIG. 3 is a cross-section on line 3—3 of FIG. 1;

DETAILED DESCRIPTION OF THE PREFERRED EMBODIMENTS

Figure 4:
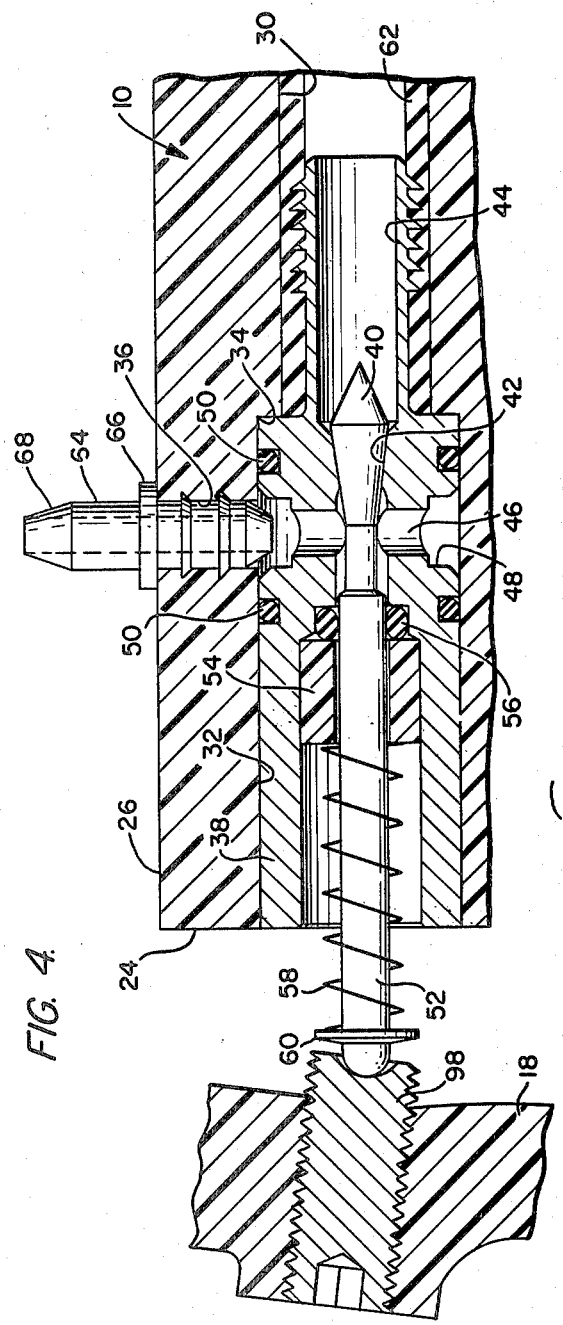
FIG. 4 is an enlarged fragmentary cross-section on line 4—4 of FIG. 3.

In FIG. 1 of the drawings, an embodiment of a foam dispensing gun of the present invention is shown to include a gun body 10 an a handle 12 to which the gun body 10 is securely fixed by suitable means (not shown) such as interlocking dovetail formations, bonding, threaded fasteners or the like. Also, the handle and body may be integral. The gun body 10 supports a slidable breech 14 which, in turn, supports a disposable mixing nozzle 16 and a depending trigger 18 having a yoke 20 at its upper end for pivotal attachment to the sliding breech 14 by a pin 22. Although the structure of each of the components as well as the manner in which they cooperate during operation of the gun will be described in more detail below, it will be noted here that the gun body 10, the handle 12, the sliding breech 14 and the trigger 18 are unitary components formed of suitable synthetic resinous or plastic material shaped by injection molding techniques.

Figure 5:
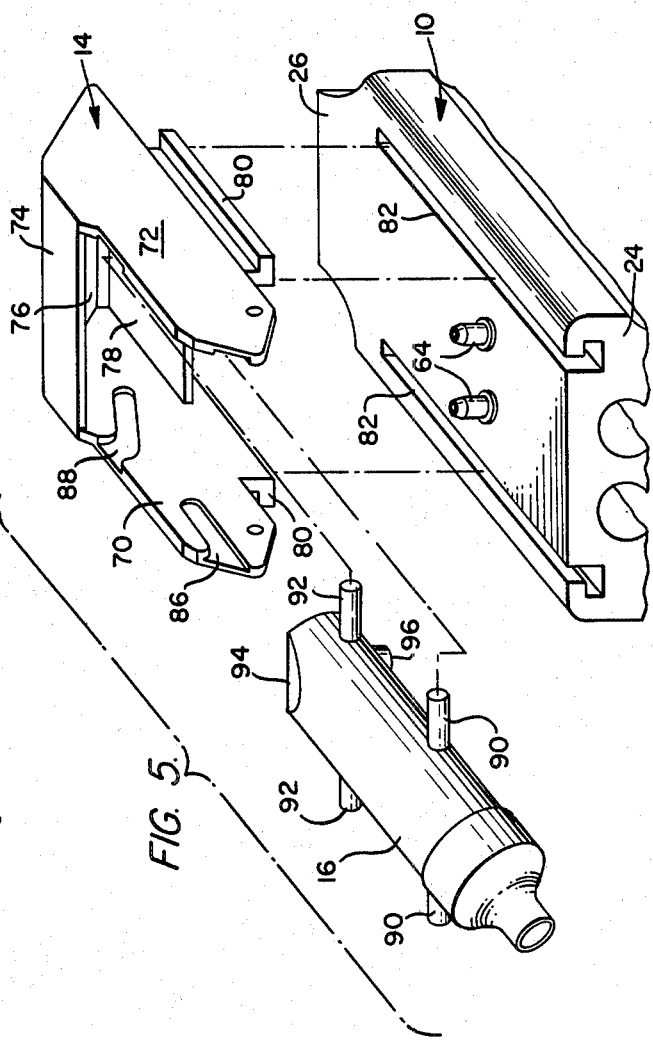
FIG. 5 is an exploded perspective view illustrating cooperating components of the foam dispensing gun.

The gun body 10, as shown in FIGS. 1, 2 and 5, is shaped externally to provide a front surface 24 joining at right angles with a planar top surface 26. A lower or base portion 28 is necked down to join with the top of the handle 12. Extending longitudinally through the body 10 are a pair of bores 30 and counterbores 32 the latter opening at the front face 24 and defining with the bores 30 annular ledges 34. A pair of vertical ports 36 extend between the counterbores 32 and the top surface 26 of the gun body as shown in FIG. 4.

Received within each of the counterbores 32 is a valve assembly including a generally cylindrical valve body 38 and a valve needle 40. The valve body 38 defines a rearwardly diverging tapered seat 42 against which the valve needle 40 seats to prevent passage of fluid in a direction from a barbed nipple portion 44 of the valve body through the seat 42 to radial valve discharge ports 46. The ports 46 open to a circular recess 48 defining with the counterbore 32 a discharge manifold located between a pair of O-ring seals 50 acting between the valve body 38 and the counterbore 32.

The valve needle 40 includes a stem 52 supported for axial movement in the valve body by an annular bushing 54. An O-ring seal 56 prevents passage of fluid from the region of the radial outlet ports 46 past the valve stem 52 and bushing 54. A valve seating spring 58 acts in compression between a press nut 60 at the outer end of the stem 62 and the bushing 54. Thus, in the absence of any external force, the valve needle 40 will be biased against the seat 42 or to a closed condition by the spring 58.

The barbed nipple portion 44 of each of the valve bodies 38 extends within one of two hoses 62 which connect the valve body 10 in fluid communication with separate sources of foam producing fluid components (not shown). The outside diameter of the hoses 62 is selected to fit slidably within the bores 30. The external diameter of the barbed nipple 44 is selected to fit within each of the hoses 62 and in a manner such that insertion of the valve body rearwardly of the gun body will result in the ends of the hoses 62 being seized between the barbed nipple portion 44 of the valve body 38 and the bores 30.

Press fit within each of the ports 36 is a nozzle coupling nipple 64. Each of the nipples 64 is provided with a stop flange 66 to limit the extent to which the coupling nipples may be depressed within the ports 36. Also, the projecting or top end of the nipple 64 is provided with a tapered seat 68.

The breech 14, as indicated, is a one piece plastic molding shaped to establish a pair of laterally spaced vertical wall portions 70 and 72 joined by transverse top, rear and bottom wall formations 74, 76 and 78, respectively, (FIGS. 1 and 5). These latter transverse walls extend from the rear of the breech 14 only partially along its length thus permitting the substantial frward portions of the walls 70 and 72 to project in open spaced relationship. At the bottom of each of the sidewalls 70 and 72 is an L-shaped rail 80 adapted to be received in one of a pair of complementing undercut or L-shaped grooves 82 formed in the top surface 26 of the gun body 10 as shown in FIG. 5. To facilitate assembly of the breech 14 with the body 10, the grooves 82 are open through the front surface 24 of the gun body 10 as shown in FIG. 5. After the rails 80 of the breech 14 are slid rearwardly into the slots 82, the coupling nipples 64 are inserted into the ports 36. As may be seen in FIGS. 1, 2 and 5, the inserted nipples project past the bottom wall formation 78 to provide a front stop for limiting forward sliding movement of the breech relative to the gun body significantly beyond the position illustrated in FIG. 1 of the drawings. Rearward movement of the breech is restricted by the rear end of the L-shaped rails 80 striking the back of the slots 82 to achieve the position illustrated in FIG. 2 of the drawings.

Each of the sidewall portions 70 and 72 of the breech 14 are provided with front and rear cam slots 86 and 88, respectively. As shown in FIGS. 1, 2 and 5, the slots 86 and 88 are spaced to receive respective fore and aft lugs 90 and 92 projecting laterally from the nozzle 16.

The nozzle 16, as shown most clearly in FIG. 5 of the drawings, is a generally cylindrical member from which the lugs 90 and 92 project diametrically. A chamfer 94 is formed at the top rear edge of the body of the nozzle and also a pair of nozzle inlet port nipples 96 (FIGS. 1, 2 and 5) project downwardly substantially in the plane of the rear lugs 92 in a manner to register with the coupling nipples 64 projecting upwardly from the top surface 26 of the gun body 10.

To assemble or load the nozzle 16 into an operative position, the breech 14 is slid rearwardly to a nozzle release position as shown in FIG. 2 of the drawings. In this position, the nozzle may be dropped downwardly so that the lugs 90 enter the forward opening of the cam slots 86 whereas the lugs 92 drop into the upper opening of the rear cam slots 88. A slight forward movement of the breech from the position shown in FIG. 2 will result in the inlet port nipples 96 on the nozzle 16 registering with and engaging the coupling nipples 64 sufficiently at least to prevent further forward movement of the nozzle 16. Upon continued movement of the breech 14 from the position shown in FIG. 2 to a nozzle retention position as shown in FIG. 1, the forward lugs 90 on the nozzle will undergo relative sliding movement in the cam slots 86 without substantial vertical variation. Because of the inclination of the rear cam slots 88 in the breech, however, the rear lugs 92 will be cammed downwardly so that the inlet nipples 96 on the nozzle move into a fluid tight engagement with the coupling nipples 64. To remove a nozzle 16 from the gun the procedure is merely reversed.

With reference again to FIGS. 1 and 2 of the drawings, it will be noted that the trigger 18 carries suitable valve stem engaging means such as a pair of set screws 98 in a position to engage the ends of the valve stems 52 when the breech 14 is positioned to retain a nozzle 16 or in the position illustrated in FIG. 1. In this condition it will be appreciated that one grasping the handle 12 and squeezing the trigger 18 will cause the valve stems to move the valve needles 40 from the valve seats 42. Fluid components under pressure and supplied through the hoses 62 will pass simultaneously through the respective valve outlet ports 46, through the coupling nipples 64 and into the nozzle 16 where the fluid components are mixed and discharged as foam through a discharge orifice 100 on the nozzle 16. Also, it will be appreciated that by varying the extent to which the trigger 18 is moved in this manner, the rate of foam discharge from the nozzle orifice 100 may be regulated.

When the breech 14 is moved to its rear position for the release or replacement of a nozzle 16, however, the trigger pivot pin 22 will be carried with the breech and the trigger will be pivoted by engagement with the front surface 24 of the gun body to an inoperative position illustrated in FIG. 2. Moreover, any attempt to move the trigger 18 to a fluid discharging condition will result in forward movement of the breech.

In light of the pivotal support of the trigger 18 from the breech 14, a substantial measure of inherent safety is provided in the foam dispensing gun of the invention. Because of the need for mixing the two fluid components of the resin system, these separate components are supplied under high pressure to the gun body 10 by way of the hoses 62. With a nozzle 16 in place, foam may be discharged with relative ease and accuracy of control through the nozzle orifice 100. If the needle valves 40 are opened while no nozzle 16 is in place, however, the fluid components will issue in high velocity streams through the open coupling nipples 64 thus representing a hazard both to the operator of the gun and to the work area in which the gun is being used. It is therefore important that the trigger 18 be disabled during nozzle replacement in the manner described above.

A further measure of safety is provided by the breech 14 in the event it is moved to the forward position of FIG. 1 without placement of a nozzle 16. In particular, the top and rear walls 74 and 76 on the breech serve to prevent accidental discharge of unmixed fluid components directly from the coupling nipples 64. As may be seen in FIG. 1, the top wall 74 becomes located above the nipples 64 when the breech is moved to the forward position. Hence, if the trigger was accidentally pulled without a nozzle 16 in place, the fluids issuing from the nipples 64 would strike the top wall 74 and be directed by the top wall and rear wall 76 forwardly away from the operator.

In FIGS. 6-9 of the drawings, an alternative embodiment of the invention is shown in which parts corresponding either structurally or functionally to parts previously described with reference to FIGS. 1-5 are designated by the same reference numerals but to which the number 100 has been added. As shown most clearly in FIG. 9, the gun components again include a body 110 supported by a handle 112, a slidable breech 114 for releasably retaining a nozzle 116 on the body 110 and a trigger 118 pivotally secured to the breech 114 by pins 122. In this embodiment, however, the body 110 and the breech 114 are slidably interconnected by cooperation between inwardly directed channel flanges 180 on the breech received in outwardly facing, open ended grooves 182 extending throughout the length of the body 110. This arrangement facilitates complete assembly of the body 110, including placement of the nozzle coupling nipples 164 prior to assembly of the body and breech, merely by sliding the latter forwardly from the rear of the body. The trigger 118 may then be attached to the breech 114 by snap fitting the pins 122 into apertures 121 in forwardly extending portions of the sidewalls 170 and 172 of the breech.

The trigger 118 in the embodiment of FIGS. 6-9 is formed with a pair of rearwardly projecting lugs 123 having shoulder-like abutment surfaces 125 at the upper edge thereof. The lugs 123 are in the region of the yoke 120 and are eccentric with respect to the trigger pivot axis as defined by the pins 122. Also as may be seen in FIG. 9, the width of the abutment surfaces 125 is such that these surfaces extend inwardly from the legs or the yoke 120. These surfaces will, therefore, ultimately engage ramp-like or chamfered surfaces 127 on the bottom edges of the breech sidewalls positioned rearwardly behind the pivot axis of the trigger.

As in the previous embodiment, the nozzle 116 is provided with pairs of diametrically projecting cylindrical lugs 190 and 192. Also, the sidewalls 170 and 180 of the breech 114 are provided with ramp formations 186 and 188 to cooperate with the lugs 190 and 192, respectively. In this instance, however, the formations 186 and 188 extend through the thickness of the sidewalls and are modified slightly in configuration. Specifically, each of the front sidewall formations 186 which cooperate with the lugs 190 include a single ejection ramp 185 and a semicircular end stop 187. The rear sidewall formations 188 include a downwardly facing top ramp surface 189 ending in a relatively large diameter circular surface 191 which in turn merges with an upwardly facing lower or ejection ramp surface 193.

Figure 6:
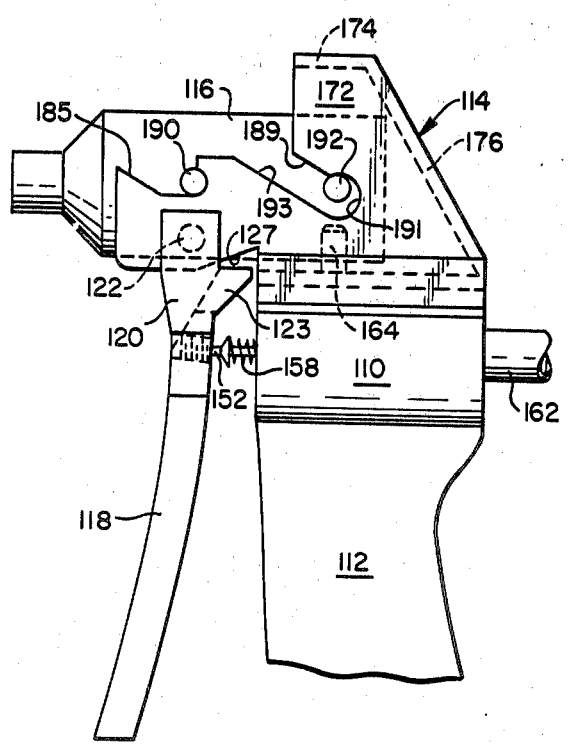
FIG. 6 is a fragmentary side elevation of an alternative embodiment of the invention.
Figure 7:
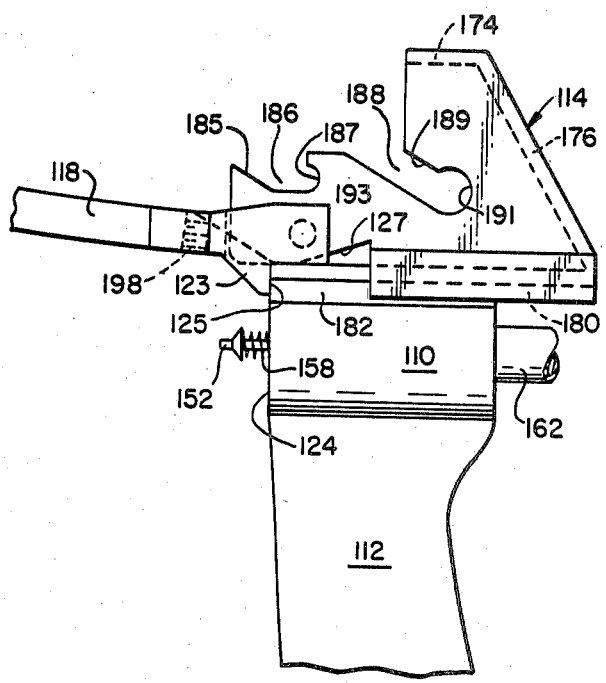
FIG. 7 is a fragmentary side elevation of the embodiment of FIG. 6 with the nozzle removed and with movable components in one relative position.
Figure 8:
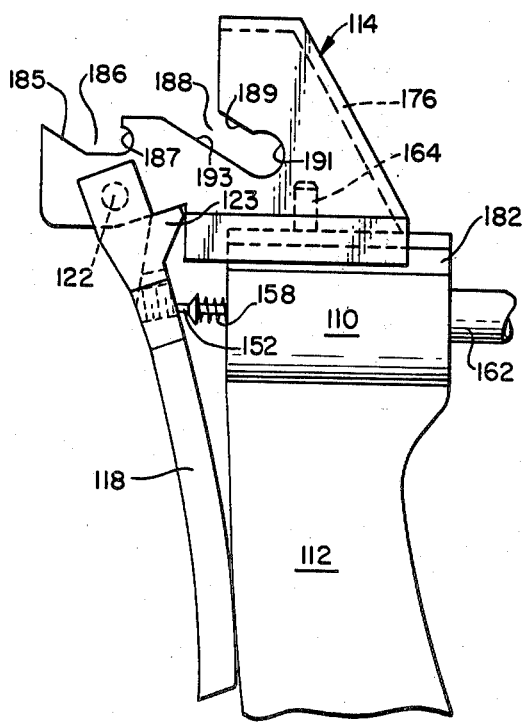
FIG. 8 is a view similar to FIG. 7 but depicting movable components in another relative position.
Figure 9:
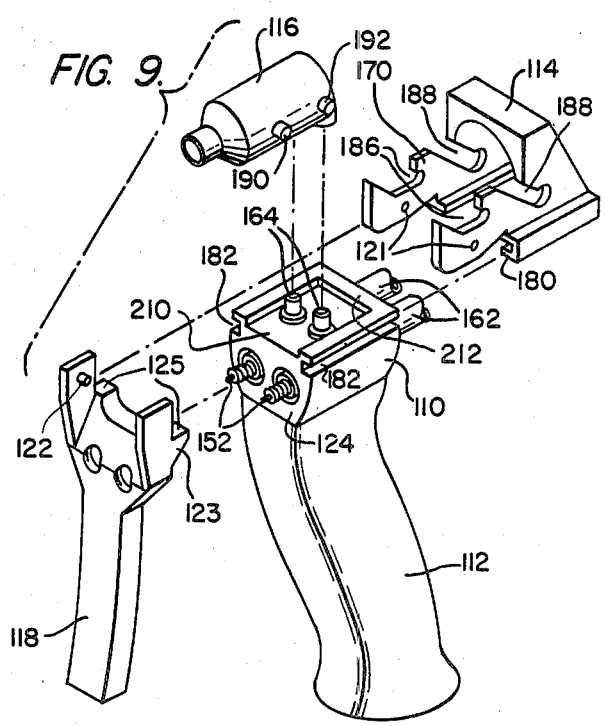
FIG. 9 is an exploded perspective view illustrating components in the embodiment of FIG. 6.
Figure 10:
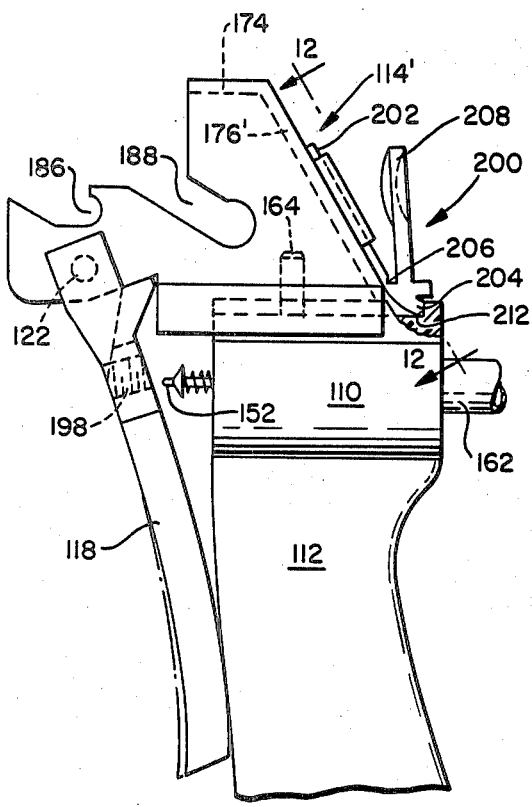
FIG. 10 is a fragmentary side elevation of a modification of the embodiment of FIGS. 6-9.
Figure 11:
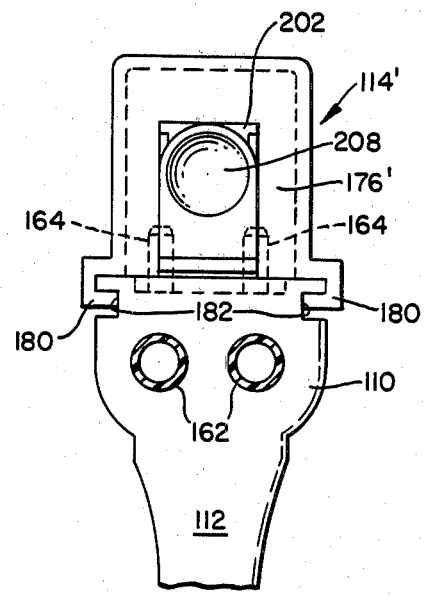
FIG. 11 is a rear end elevation of the modification illustrated in FIG. 10.

Operation of the embodiment illustrated in FIGS. 6-9 to load or unload the nozzle 116 may be understood by a comparison of FIGS. 6-8. Thus, in FIG. 7, the breech 114 is pulled rearwardly to its limit of such movement as determined by engagement of the shoulder surfaces 125 on the lugs 123 with the front surface 124 of the body 110. In this condition, the trigger 118 is pivoted upwardly out of engagement with the valve pins 152 in a manner similar to the embodiment of FIGS. 1-5. In this instance, however, the lugs 123 function to restrict accidental removal of the entire breech 114 from the body 110. The nozzle 116 is placed so that the diametric lugs 190 and 192 thereon rest respectively on the ramp surfaces 185 and 193. Also, the inlet port nipples 196 in the nozzle will be received over the coupling nipples 164 sufficiently to prevent forward movement of the nozzle 116. The breech 114 is then moved forward either by direct manual pressure or by downward movement of the trigger 118. In this latter respect, the lugs 123 act as crank arms which, upon such downward movement of the trigger 118, will cause forward movement of the breech 114. Such movement is continued until the semicircular stop in the front sidewall formation 186 engages the front pins 190. In this position which is illustrated in FIG. 6, the rear lug will be positioned under the upper portion of the enlarged circular opening 191 and be prevented from upward movement. Also in the position of FIG. 6, the gun is ready for actuation merely by squeezing the trigger 118 against the handle 112 to depress the valve pins 152 in the manner described above with respect to FIGS. 1-5.

To eject the nozzle, the breech is pulled rearwardly to the position shown in FIG. 7. The cam surfaces 185 and 187 will coact with the lugs 190 and 192, respectively, to lift the nozzle from the nipples 164 for removal.

The facility for obtaining the relative orientation of components shown in FIG. 7 is significant also for field calibration or adjustment of the extent to which the respective individual valve stems 152 will be opened by manual actuation of the trigger 118 given the orientation of components shown in FIG. 6. As mentioned previously and with reference to FIG. 4 of the drawings, it will be recalled that the tapered valve needles 40 close by seating in the rearwardly diverging tapered seats 42 and open gradually under trigger actuation by rearward movement from the seat to enable a regulated rate of foam discharge. Also, each of the valve stems 52, 152 is engaged by an adjustable set screw 98, 198 in the trigger 18, 118. If during operation of the gun it is found that the foam discharge from the nozzle 16, 116 is not a correctly balanced mixture of the fluid components supplied through the individual conduits 62, 162, the set screws 98, 198 may be adjusted to compensate. Such incorrect proportioning may be observed, moreover by manually depressing each individual valve stem 152 to discharge the separate fluid components directly from each of the corresponding nipples 164 and comparing the weights of the individual components so discharged over a predetermined time interval. In this way, the gun permits field compensation for the cause of the improper mixture such as differing pressure on the fluid component supply through the conduits 162, accidental and unequal restriction to fluid component flow in the passageways up to the nipples 164, all by adjustment of the set screws 98, 198.

The condition which occurs in the absence of a nozzle 116 and in the event of accidental squeezing of the trigger 118 when no nozzle is in place, is illustrated in FIG. 8. In particular, the trigger 118 is shown pivoted over the valve pins 152 but with the breech 114 advanced forwardly to such an extent that no depression of the valve pins 152 can occur. In other words, when no nozzle is positioned in the breech and on the coupling nipples 164, the absence of the pins 190 for engagement of the pins by the semicircular end stops 187, coupled with the compressive resistance of the springs 158 urging the valve pins 152 forwardly, prevents trigger actuation of the valve pins 152. Continued forward movement of the breech 114 is ultimately restricted by the back wall surface 176 engaging the coupling nipples 164.

The embodiment of FIGS. 6-9, therefore, has several advantages. In particular, the organization of components in this latter embodiment facilitates assembly. Additionally, the gun structure prevents accidental discharge of resin in the absence of a mixing nozzle 116 being in place. Further, loading of the nozzle is facilitated by the leverage effect of the lugs 123 on the trigger 118 as described above.

In FIGS. 10-13 of the drawings, a modification of the embodiment of FIGS. 6-9 is shown and which is adapted for an additional measure of safety against inadvertent discharge of fluid from the nipples 164 when a nozzle 116 is not in place. In particular, the rear wall 176' of the breech 114' is modified to receive a safety latch 200 operative to positively retain the breech 114' in a forwardly advanced or "safe" position shown in FIG. 10. In this "safe" position, the breech 114' is advanced forwardly of the position to which it is moved by pivotal action of the trigger 118 on the valve stems 152 (FIG. 8). As may be seen in FIG. 10, the set screws 198 are prevented from contact with the valve stems 152 when the breech 114' is in the safe position. The latch 200, which is releasably connected to the rear wall 176' of the breech 114' in a manner to be described in more detail below, is a one-piece molding of resilient plastic, such as nylon, and includes a mounting platform portion 202 separated from a pawl portion 204 by a resilient hinge 206 defined by a V-shaped groove forming a line of reduced thickness. A thumb lever 208 projects rigidly from the pawl portion 204.

With reference again to FIG. 9 of the drawings, it will be noted that the top of the body 110 is formed with a rectangular recess 210 circumscribed on opposite sides and about the back thereof by a step 212. The recess serves to confine any residual fluid that may issue from the nipples 164 and prevent same from fowling sliding movement of the breech relative to the body. The safe position shown in FIG. 10, therefore, is secured by the latch pawl 204 dropping down into the recess 210 and engaging the step 212 at the back edge thereof. The latch may be released simply by depressing the thumb lever 208 toward the wall 176' so that the pawl 204 lifts out of the recess 210 clear of the step 212. The nature of the hinge 206 and the resilient or elastic characteristics of the material from which the latch 200 is molded act in a manner to bias the pawl 204 downwardly into the recess as the breech 214' is moved forwardly to at least the position shown in FIG. 10.

Figure 12:
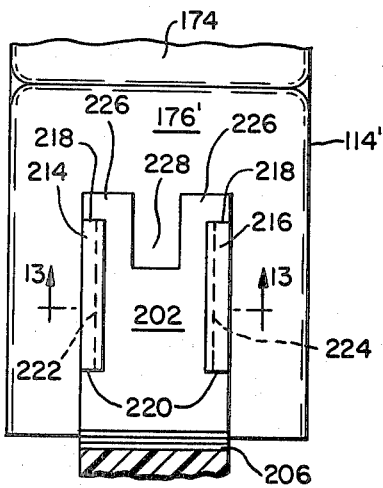
FIG. 12 is an enlarged fragmentary cross-section on lie 12—12 of FIG. 10.
Figure 13:
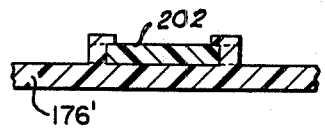
FIG. 13 is a fragmentary cross-section on line 13—13 of FIG. 12.

In FIGS. 12 and 13, the structural configuration of the mounting platform 202 and related structure by which the mounting platform is retained against the rear wall 176' of the breech 114' is illustrated most clearly. As shown in these figures, the rear wall 176' is provided with a pair of outwardly projecting, inverted L-shaped rails 214 and 216, each having top and bottom ends 218 and 220. The mounting platform 202 is provided along its sides with cut-outs 222 and 224 of a length complementing the length between the ends of the rails 214 and 216. The cut-outs 222 and 224, together with the thickness of the platform 202 allow the latter to fit in the undercut defined by the inverted L-shaped configuration of the rails 214 and 216. At the upper end of the platform, a pair of outwardly directed tabs 226 are provided and spaced by a cut-out 228. The cut-out 228 allows the tabs 226 to be flexed inwardly so that the mounting platform may be slid upwardly under the L-shaped rails 214 and 216 until the bottom end 220 of the rails is engaged by the lower end of the cut-outs 222 and 224. In this manner, the latch 200 is securely but releasably and replaceably mounted to the rear of the breech.

The latch 200 is an additional measure of safety in light of the description above with respect to FIG. 8. In particular, the strength of the valve plunger springs 158 is, under most circumstances, sufficient to cause the breech to move forwardly to the position shown in FIG. 8 without actuation of the valve stems 152 by the trigger 118 in the absence of a nozzle in the breech 114. It is physically possible, however, by deflecting the trigger or by sudden squeezing action of the trigger, to actuate the valves sufficiently to allow at least some of the fluid to issue from the nipples 164. When the breech 114' is positioned by the latch 200, however, any flexure in the trigger 118 from the phantom line illustration in FIG. 10 cannot result in valve opening movement of the stems 152. Because of the inherent safety of the embodiment of FIGS. 6-9, the latch 200 may be considered as an optional safety adjunct to be used under severe operating conditions where nozzle replacement is frequent or where the gun is used by personnel who are relatively inexpereinced. It is contemplated that the latch would be supplied in place on the gun but removable and replaceable at the option of the operator in the field.

Thus it will be appreciated that as a result of the present invention, a highly effective foam dispensing gun is provided. It is contemplated and believed to be apparent to those skilled in the art from the preceding description that modifications and/or changes may be made in the disclosed embodiment without departure from the present invention. Accordingly, it is expressly intended that the foregoing description is illustrative of a preferred embodiment only, not limiting, and that the true spirit and scope of the present invention be determined by reference to the appended claims.

I claim:

1. A foam dispensing gun adapted to be connected to separate pressurized fluid components to be mixed and dispensed from the gun, said gun comprising:
    a gun body having a pair of fluid passageways adapted to be connected to the respective pressurized fluid components, and a pair of nipples fixed to and projecting from said body on one of two mutually perpendicular axes, said nipples defining outlets for said passageways;
    valve means for controlling the flow of fluid components through said passageways to said nipples;
    a disposable nozzle having a pair of inlet openings to receive and establish fluid communication with said nipples;
    a breech slidable on said gun body in a direction parallel to the other of said two axes between a first position in which it is retracted to permit movement of the nozzle on said one directional axis so that said nipples are received in said inlet openings, a second position for retaining said nozzle in an operative orientation with respect to said gun body, and a third position forwardly of said second position from said first position in the absence of a nozzle member in said operative position; and
    trigger means pivotally supported from said breech to be in an operative position for actuating said valve means only when said breech is in said second position.

2. The apparatus recited in claim 1, wherein said breech and said body are slidably interconnected by means including open ended guideways, said trigger having stop lug means engageable with said body for limiting rearward movement of said breech to said first position.

3. The apparatus recited in claim 2, wherein said stop lug means cooperate with said body to pry said breech from said first position toward said second position upon actuating movement of said trigger means.

4. The apparatus recited in claim 1, including yieldable biasing means for retaining said valve means in a closed condition, said valve means being moved toward an open condition by actuating movement of said trigger means against said biasing means when said breech is in said second position by retaining engagement of said nozzle, said trigger means being pivotal about said valve means by retention of said valve means under said bias means, thereby to move said breech to said third position in the absence of a nozzle.

5. The apparatus recited in either of claims 1 or 4 comprising safety means for releasably retaining said breech in a fourth position in which said trigger means is prevented from contact with said valve means.

6. The apparatus recited in claim 5 wherein said safety means comprises a latch carried by said breech and having a pivotal pawl portion, said gun body including means to define a forwardly facing step, said pawl portion being engagable with said step when said breech is in said fourth position.

7. The apparatus recited in claim 6 including means to releasably mount said latch on said breech.

8. A foam dispensing gun adapted to be connected to separate pressurized fluid components to be mixed and dispensed from the gun, said gun comprising:
    a gun body having a pair of fluid passageways adapted to be connected to the respective pressurized fluid components, and means defining outlets for said passageways;
    independent valve means in each of said passageways for regulating the rate of fluid component flow to said outlets, respectively, each of said valve means having an actuating stem projecting from said body;
    a disposable nozzle member having means to define a pair of inlets adapted for releasable coupling with said outlets;
    means to releasably retain said nozzle member in an operative orientation with respect to said gun body; and
    trigger means pivotally supported for movement between an operative condition relative to said valve stems for control of said valve means jointly and an inoperative condition clear of said valve stems to enable free manual access to said valve stems when said trigger means is in said inoperative condition, said trigger means having adjustable valve stem engaging means for controlling the relative rate of fluid component flow to said outlets, respectively, upon actuation of said trigger means in said operative condition.

9. The apparatus recited in claim 8 wherein said means to releasably retain said nozzle member comprises a breech slidable on said gun body between a retracted position and a nozzle retaining position, said trigger means being pivotally supported from said breech to be in said operative condition when said breech is in said nozzle retaining position and to be in said inoperative condition when said breech is in said retracted condition.

10. The apparatus recited in claim 9 wherein said breech includes a transverse wall portion to overlie said outlets when said breech is in said nozzle retaining position but displaced from said outlets when said breech is in said retracted position to permit unrestricted flow of fluid components from said outlet by manual depression of said valve stems with said trigger means in said inoperative condition.

* * * * *